United States Patent
Rai et al.

(10) Patent No.: US 10,462,649 B2
(45) Date of Patent: Oct. 29, 2019

(54) TECHNIQUES AND APPARATUSES FOR POWER CONSUMPTION MANAGEMENT RELATING TO UNIVERSAL INTEGRATED CIRCUIT CARDS

(71) Applicant: QUALCOMM Incorporated, San Diego, CA (US)

(72) Inventors: Keemat Rai, Hyderabad (IN); Rajasekar Raja, Los Angeles, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/660,344

(22) Filed: Jul. 26, 2017

(65) Prior Publication Data

US 2019/0037389 A1     Jan. 31, 2019

(51) Int. Cl.
*H04W 8/22*     (2009.01)
*H04W 52/02*     (2009.01)
*H04W 88/02*     (2009.01)

(52) U.S. Cl.
CPC ......... *H04W 8/22* (2013.01); *H04W 52/0216* (2013.01); *H04W 88/02* (2013.01)

(58) Field of Classification Search
CPC ......... H04W 8/22; H04W 88/02; H04W 8/24; H04W 52/0216
See application file for complete search history.

(56) References Cited

U.S. PATENT DOCUMENTS

| | | | |
|---|---|---|---|
| 8,837,449 B2 | 9/2014 | Chen et al. | |
| 2009/0058635 A1* | 3/2009 | Lalonde | A61N 1/37282 340/539.11 |
| 2012/0069800 A1* | 3/2012 | Soliman | H04W 48/08 370/329 |
| 2012/0106533 A1* | 5/2012 | Chen | H04W 8/205 370/342 |

(Continued)

FOREIGN PATENT DOCUMENTS

WO    WO-2008150060 A1    12/2008

OTHER PUBLICATIONS

Partial International Search Report—PCT/US2018/040396—ISA/EPO—dated Sep. 21, 2018.

(Continued)

*Primary Examiner* — Dinh Nguyen
(74) *Attorney, Agent, or Firm* — Harrity & Harrity, LLP

(57) ABSTRACT

Certain aspects of the present disclosure generally relate to wireless communication. In some aspects, an equipment, such as a mobile equipment or user equipment (ME/UE), may determine that a universal integrated circuit card (UICC) coupled to the equipment is associated with a particular bit value indicating to skip at least one polling event of a polling cycle; and/or skip the at least one polling event based at least in part on the particular bit value In some aspects, the equipment may provide category information indicating a device category of the equipment, wherein the category information is provided to a UICC of the equipment; and/or receive, from the UICC, configuration infor- (Continued)

mation that is based at least in part on the category information, wherein the configuration information relates to an operation associated with power consumption by the equipment. Numerous other aspects are provided.

28 Claims, 11 Drawing Sheets

(56) References Cited

U.S. PATENT DOCUMENTS

| | | | |
|---|---|---|---|
| 2013/0017862 A1* | 1/2013 | Lee | H04W 60/005 455/558 |
| 2013/0344857 A1* | 12/2013 | Berionne | H04W 88/02 455/418 |
| 2014/0187291 A1 | 7/2014 | Seo et al. | |
| 2014/0235237 A1* | 8/2014 | Shin | H04W 48/16 455/434 |
| 2015/0072736 A1* | 3/2015 | Berionne | H04W 52/0261 455/558 |
| 2015/0282091 A1 | 10/2015 | Lin et al. | |
| 2016/0088464 A1 | 3/2016 | Hans | |

OTHER PUBLICATIONS

Qualcomm Incorporated: "Alignment of UICC Polling Interval with eDRX Cycle", 3GPP Draft; CP-150844, 3rd Generation Partnership Project (3GPP), Mobile Competence Centre; 650, Route Des Lucioles; F-06921 Sophia-Antipolis Cedex; France, vol. TSG CT, No. Sitges, Spain; Dec. 7, 2015-Dec. 8, 2015 Dec. 2, 2015, XP051048903, Retrieved from the Internet: URL:http://www.3gpp.org/ftp/Meetings_3GPP_SYNC/CT/Docs/ [retrieved on Dec. 2, 2015], 2 pages.
International Search Report and Written Opinion—PCT/US2018/040396—ISA/EPO—dated Nov. 15, 2018.

* cited by examiner

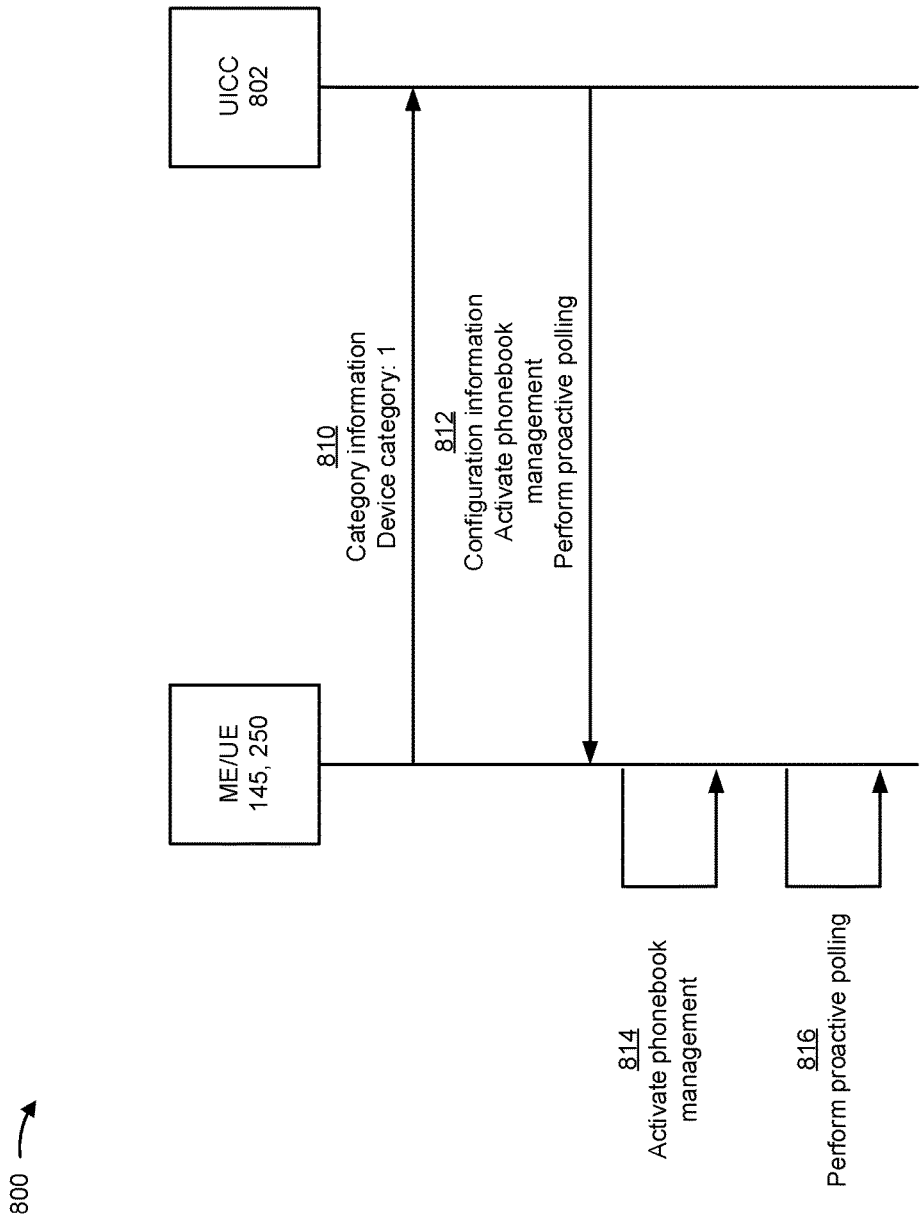

TECHNIQUES AND APPARATUSES FOR POWER CONSUMPTION MANAGEMENT RELATING TO UNIVERSAL INTEGRATED CIRCUIT CARDS

FIELD OF THE DISCLOSURE

Aspects of the present disclosure generally relate to wireless communication, and more particularly to techniques and apparatuses for power consumption management relating to universal integrated circuit cards (UICCs).

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining that a universal integrated circuit card (UICC) coupled to an equipment, such as a mobile equipment or user equipment (ME/UE), is associated with a particular bit value indicating to skip at least one polling event of a polling cycle; and/or skipping the at least one polling event based at least in part on the particular bit value.

In some aspects, an equipment, such as a ME/UE, may include a memory and one or more processors operatively coupled to the memory. The one or more processors may be configured to determine that a UICC coupled to the equipment is associated with a particular bit value indicating to skip at least one polling event of a polling cycle; and/or skip the at least one polling event based at least in part on the particular bit value.

In some aspects, a non-transitory computer-readable medium may store one or more instructions for wireless communication. The one or more instructions, when executed by one or more processors of an equipment, such as a ME/UE, may cause the one or more processors to determine that a UICC coupled to the equipment is associated with a particular bit value indicating to skip at least one polling event of a polling cycle; and/or skip the at least one polling event based at least in part on the particular bit value.

In some aspects, an apparatus for wireless communication may include means for determining that a UICC coupled to the apparatus is associated with a particular bit value indicating to skip at least one polling event of a polling cycle; and/or means for skipping the at least one polling event based at least in part on the particular bit value.

In some aspects, a method of wireless communication may include providing category information indicating a device category of an equipment, such as a ME/UE, wherein the category information is provided to a UICC of the equipment; and/or receiving, from the UICC, configuration information that is based at least in part on the category information, wherein the configuration information relates to an operation associated with power consumption by the equipment.

In some aspects, an equipment, such as a ME/UE, may include a memory and one or more processors operatively coupled to the memory. The one or more processors may be configured to provide category information indicating a device category of the equipment, wherein the category information is provided to a UICC of the equipment; and/or receive, from the UICC, configuration information that is based at least in part on the category information, wherein the configuration information relates to an operation associated with power consumption by the equipment.

In some aspects, a non-transitory computer-readable medium may store one or more instructions for wireless communication. The one or more instructions, when executed by one or more processors of an equipment, such as a ME/UE, may cause the one or more processors to provide category information indicating a device category of the equipment, wherein the category information is provided to a UICC of the equipment; and/or receive, from the UICC, configuration information that is based at least in part on the category information, wherein the configuration information relates to an operation associated with power consumption by the equipment.

In some aspects, an apparatus for wireless communication may include means for providing category information indicating a device category of the apparatus, wherein the category information is provided to a UICC of the apparatus; and/or means for receiving, from the UICC, configuration information that is based at least in part on the category information, wherein the configuration information relates to an operation associated with power consumption by the apparatus.

Aspects generally include a method, apparatus, system, computer program product, non-transitory computer-readable medium, user equipment, wireless communication device, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8A and 8B are diagrams illustrating examples of configuring features associated with a universal integrated circuit card for power management, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
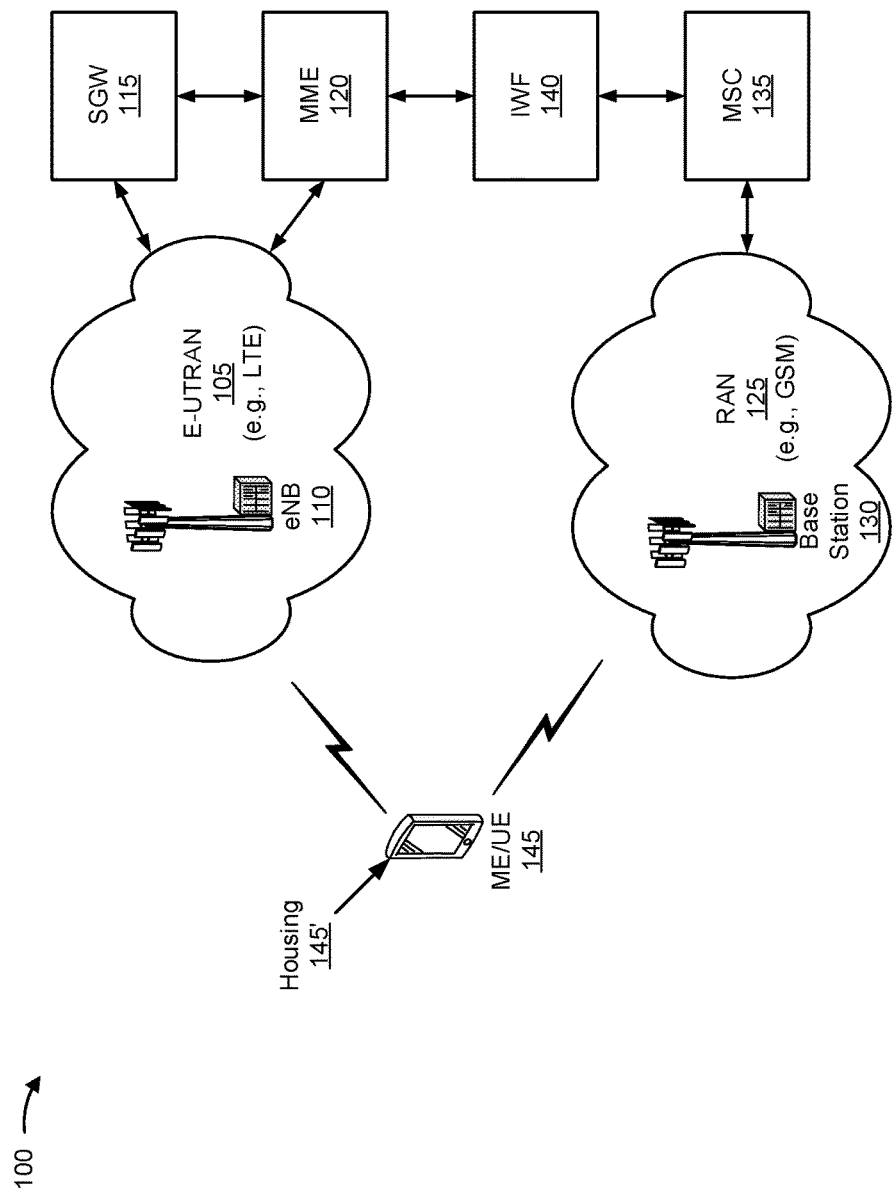
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more equipments, such as mobile equipments or user equipments (ME/UEs), 145 capable of communicating via E-UTRAN 105 and/or RAN 125. In aspects, a mobile equipment or user equipment (ME/UE) may include an eMTC device (e.g., such as a water meter or a fire alarm device), a mobile phone, a tablet and/or the like.

E-UTRAN 105 may support, for example, LTE or another type of RAT. E-UTRAN 105 may include eNBs 110 and other network entities that can support wireless communication for equipments, such as ME/UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for equipments, such as ME/UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for equipments, such as ME/UEs 145. MSC 135 may communicate with RAN 125 and may perform various functions, such as voice services, routing for circuit-switched calls, and mobility management for equipments, such as ME/UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with equipment, such as ME/UE 145. In some aspects, E-UTRAN 105 and RAN 125 may use different frequencies and/or RATs to communicate with equipments, such as ME/UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

Equipment, such as ME/UE 145, may be portable, stationary, and/or mobile and may also be referred to as a mobile station, a terminal, an access terminal, a wireless communication device, a subscriber unit, a station, and/or the like. Equipment, such as ME/UE 145, may be a cellular phone, a personal digital assistant (PDA), a wireless modem, a wireless communication device, a handheld device, a laptop computer, a cordless phone, a wireless local loop (WLL) station, and/or the like. Equipment, such as ME/UE 145, may be included inside a housing 145' that houses components of such equipment, such as processor components, memory components, and/or the like.

Upon power up, equipment, such as ME/UE 145, may search for wireless networks from which such equipment can receive communication services. If equipment, such as ME/UE 145, detects more than one wireless network, then a wireless network with the highest priority may be selected to serve such equipment and may be referred to as the serving network. Equipment, such as ME/UE 145, may perform registration with the serving network, if necessary. Equipment, such as ME/UE 145, may then operate in a connected mode to actively communicate with the serving network. Alternatively, equipment, such as ME/UE 145, may operate in an idle mode and camp on the serving network if active communication is not required by such equipment.

Equipment, such as ME/UE 145, may operate in the idle mode as follows. Equipment, such as ME/UE 145, may identify all frequencies/RATs on which it is able to find a "suitable" cell in a normal scenario or an "acceptable" cell in an emergency scenario, where "suitable" and "acceptable" are specified in the LTE standards. Equipment, such as ME/UE 145, may then camp on the frequency/RAT with the highest priority among all identified frequencies/RATs. Equipment, such as ME/UE 145, may remain camped on this frequency/RAT until either (i) the frequency/RAT is no longer available at a predetermined threshold or (ii) another frequency/RAT with a higher priority reaches this threshold. In some aspects, equipment, such as ME/UE 145, may receive a neighbor list when operating in the idle mode, such as a neighbor list included in a system information block type 5 (SIB 5) provided by an eNB of a RAT on which such equipment is camped. Additionally, or alternatively, equipment, such as ME/UE 145, may generate a neighbor list. A neighbor list may include information identifying one or more frequencies, at which one or more RATs may be accessed, priority information associated with the one or more RATs, and/or the like.

Equipment, such as ME/UE 145, 250, may be associated with a subscriber identity module (SIM) or a universal subscriber identity module (USIM). For example, the SIM or USIM may include an application that may run on a SIM card or a Universal Integrated Circuit Card (UICC), which may be coupled to such equipment. In some aspects, the SIM card or UICC may be swappable. In some aspects, the SIM card or UICC may not be easily swappable (e.g., may be soldered to equipment, such as ME/UE 145, 250). The SIM or USIM may store or provide user-specific data, such as a phone number, a user identifier, a device identifier, a home network identity, security information, and/or the like. Some SIMs or USIMs may provide more advanced functionality, such as phonebook functionality, dialing functionality, and/or the like, at the cost of increased battery consumption relative to simpler SIMs or USIMs. In some aspects, equipment, such as an ME, for example, may use a UICC. In some aspects, equipment, such as a UE, for example, may use a SIM card. However, for techniques and apparatuses described herein, any reference to a UICC is inclusive of a SIM card and any reference to a SIM card is inclusive of a UICC. In other words, techniques and apparatuses described herein are equally applicable to UICCs, SIM cards, SIMs, and USIMs of MEs and/or of UEs.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
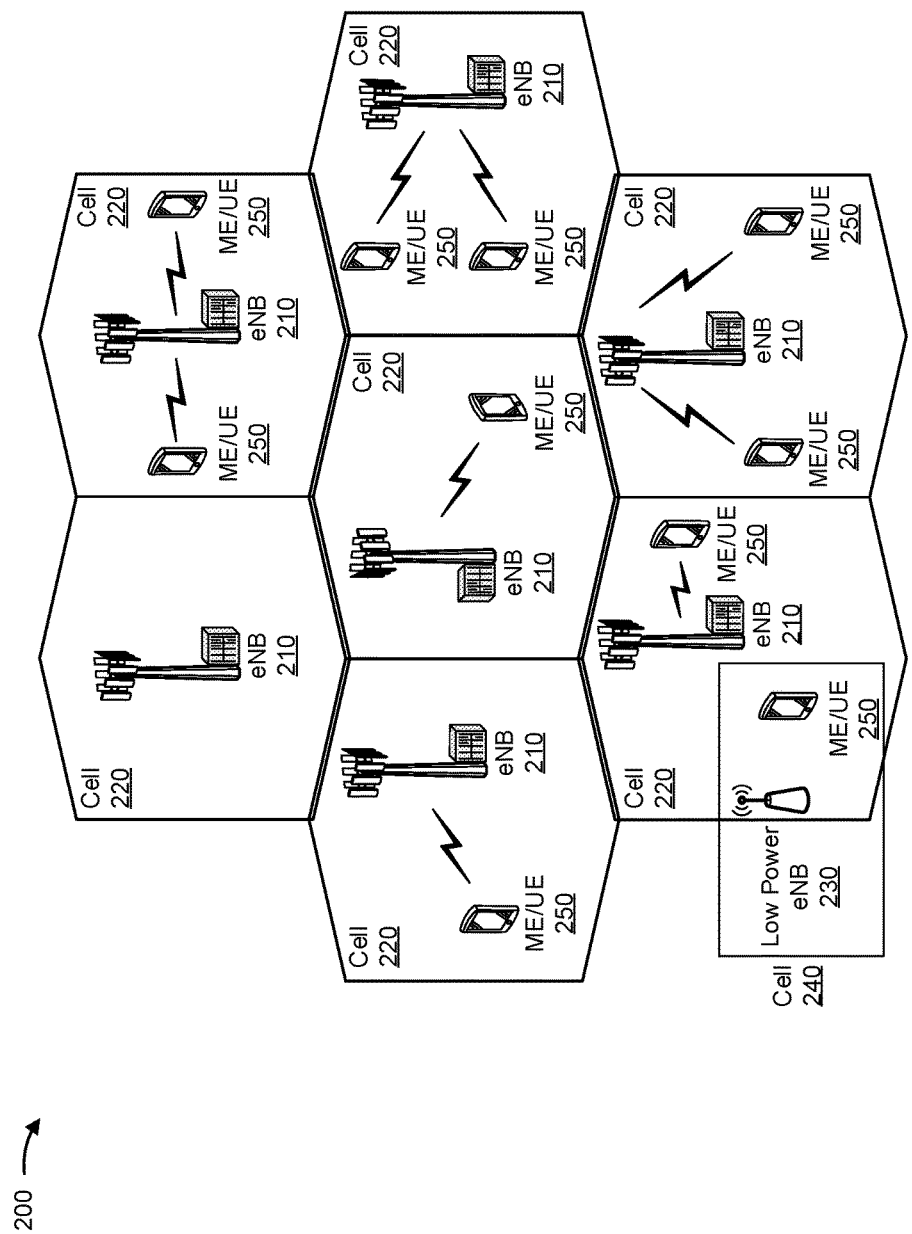
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of ME/UEs 250.

Each eNB 210 may be assigned to a respective cell 220 and may be configured to provide an access point to a RAN. For example, eNB 110, 210 may provide an access point for ME/UE 145, 250 to E-UTRAN 105 (e.g., eNB 210 may correspond to eNB 110, shown in FIG. 1) or may provide an access point for equipment, such as ME/UE 145, 250, to RAN 125 (e.g., eNB 210 may correspond to base station 130, shown in FIG. 1). In some cases, the terms base station and eNB may be used interchangeably, and a base station, as used herein, is not tied to any particular RAT. ME/UE 250 may correspond to ME/UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single ME/UE 145, 250 to increase the data rate or to multiple ME/UEs 145, 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the equipment(s), such as ME/UE(s) 145, 250, with different spatial signatures, which enables each of the equipment(s) to recover the one or more data streams destined for that equipment. On the UL, each equipment, such as ME/UE 145, 250, transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a discrete Fourier transform (DFT)-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
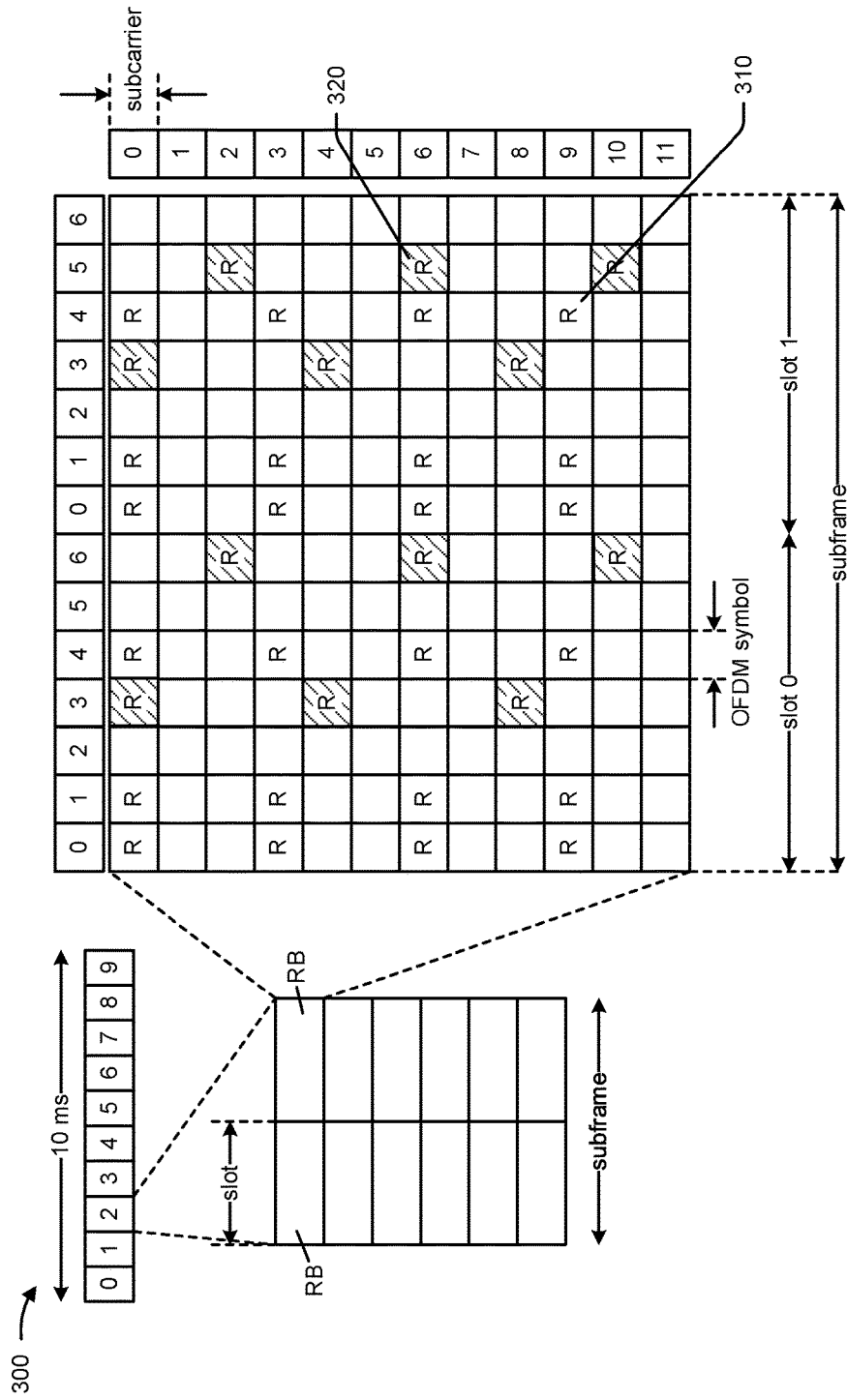
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that an equipment, such as a ME/UE receives and the higher the modulation scheme, the higher the data rate for the equipment.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by equipments, such as MEs/UEs, for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical hybrid automatic repeat request (HARQ) Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for equipments, such as a MEs/UEs, scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of equipments, such as MEs/UEs, in certain portions of the system bandwidth. The eNB may send the PDSCH to specific equipments, such as MEs/UEs, in specific portions of the system bandwidth. The eNB may send the PSS, SSS, PBCH, PCFICH, and PHICH in a broadcast manner to all equipments, such as MEs/UEs, may send the PDCCH in a unicast manner to specific UEs, and may also send the PDSCH in a unicast manner to specific equipments, such as MEs/UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

An equipment, such as a ME/UE, may know the specific REGs used for the PHICH and the PCFICH. The equipment, such as the ME/UE, may search different combinations of REGs for the PDCCH. The number of combinations to search is typically less than the number of allowed combinations for the PDCCH. An eNB may send the PDCCH to such equipment in any of the combinations that the equipment will search.

As indicated above, FIG. 3 is provided as an example. Other examples are possible and may differ from what was described above in connection with FIG. 3.

Figure 4:
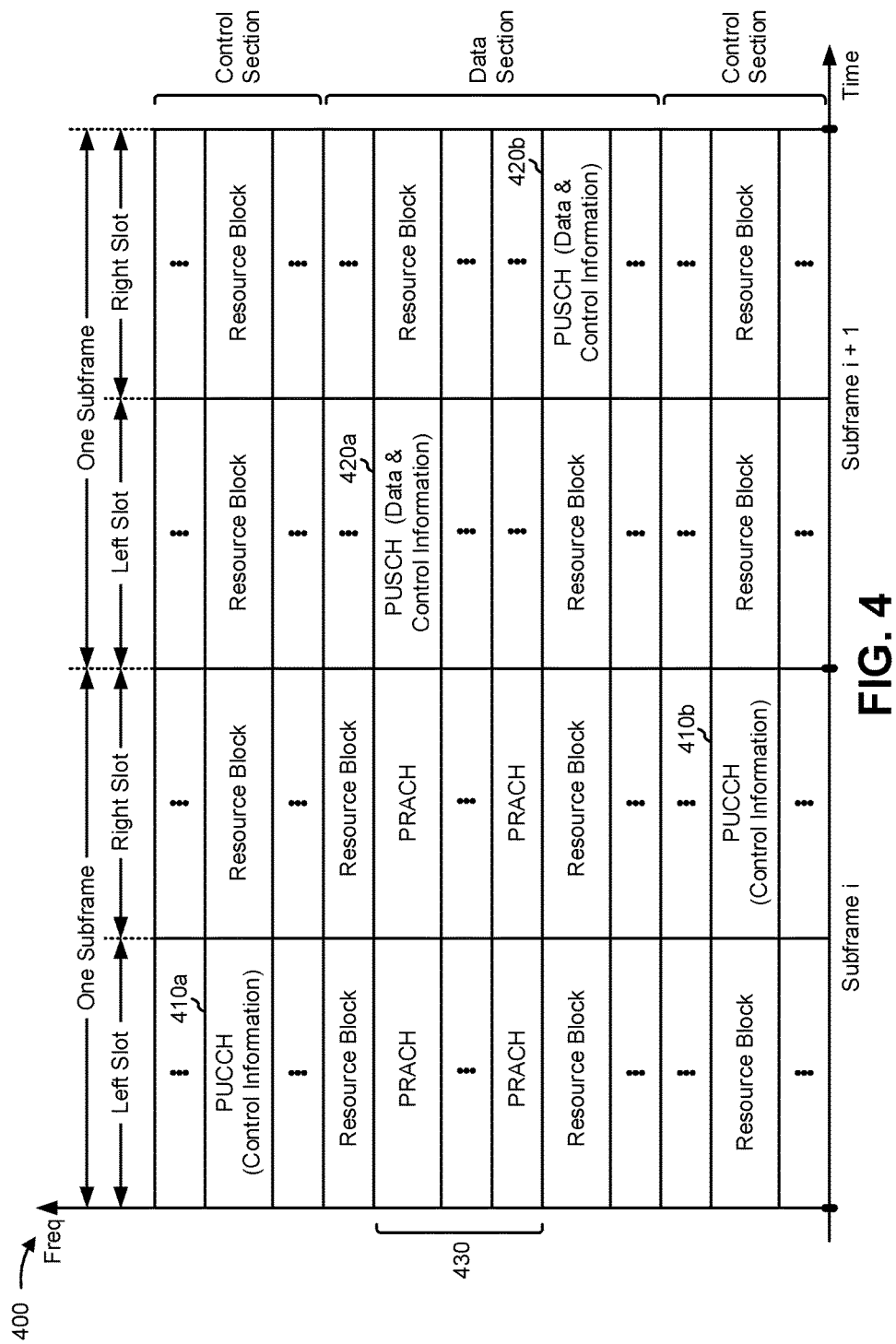
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to equipments, such as MEs/UEs, for transmission of control information. The data section may include all resource blocks not included in the control section. The UL frame structure results in the data section including contiguous subcarriers, which may allow a single equipment, such as a ME/UE, to be assigned all of the contiguous subcarriers in the data section.

An equipment, such as a ME/UE, may be assigned resource blocks 410a, 410b in the control section to transmit control information to an eNB. The equipment may also be assigned resource blocks 420a, 420b in the data section to transmit data to the eNB. The equipment may transmit control information in a physical UL control channel (PUCCH) on the assigned resource blocks in the control section. The equipment may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a ME/UE can make only a single PRACH attempt per frame (e.g., of 10 ms).

As indicated above, FIG. 4 is provided as an example. Other examples are possible and may differ from what was described above in connection with FIG. 4.

Figure 5:
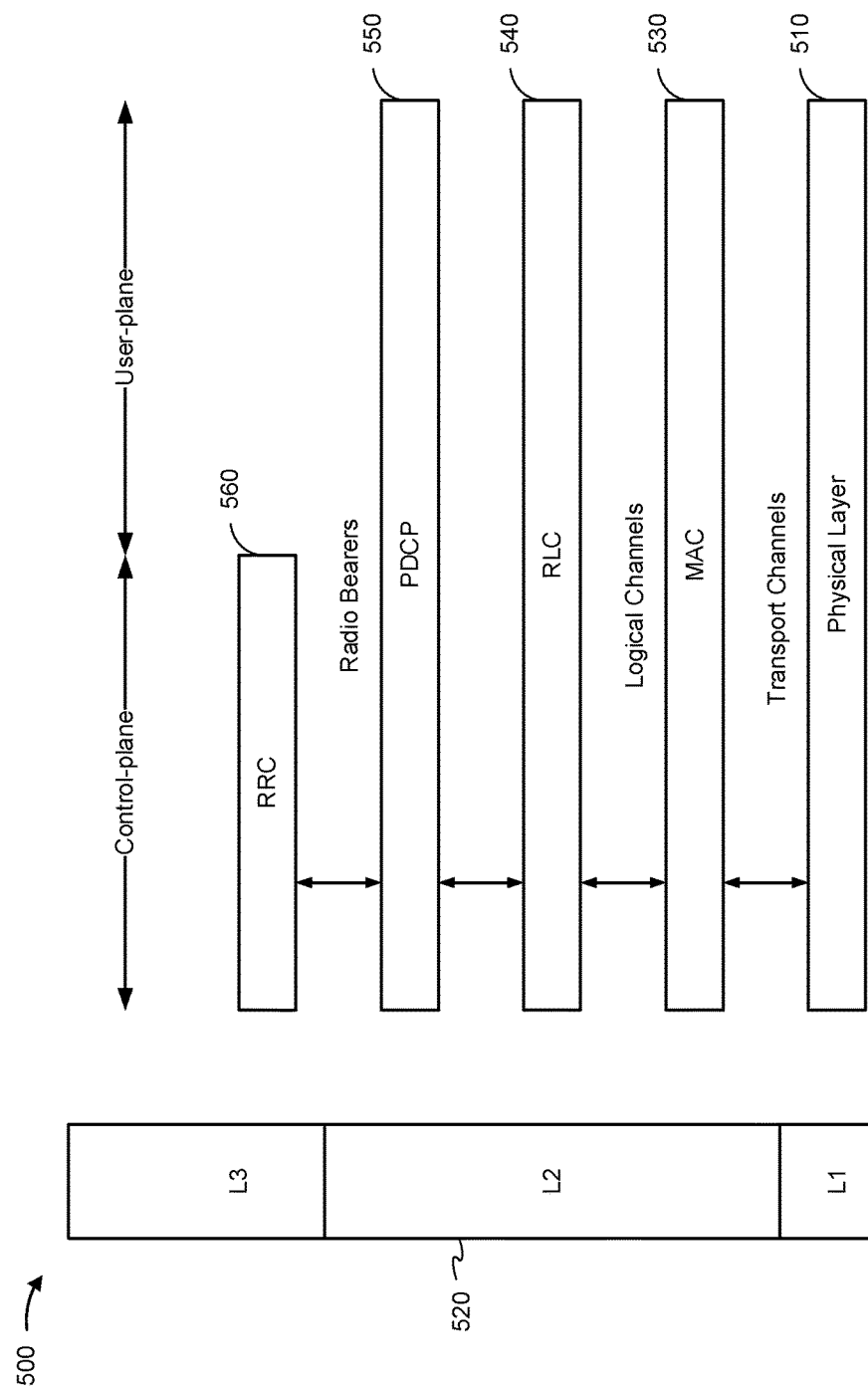
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the equipment, such as a ME/UE, and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the equipment, such as a ME/UE, and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the equipment, such as a ME/UE, may have several upper layers above the L2 layer 520 including a network layer (e.g., Internet Protocol (IP) layer) that is terminated at a packet data network (PDN) gateway on the network side, and an application layer that is terminated at the other end of the connection (e.g., a far end equipment, such as a ME/UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for equipments, such as MEs/UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the equipments. The MAC sublayer 530 is also responsible for HARQ operations.

In the control plane, the radio protocol architecture for the equipment, such as a ME/UE, and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the equipment, such as a ME/UE.

As indicated above, FIG. 5 is provided as an example. Other examples are possible and may differ from what was described above in connection with FIG. 5.

Figure 6:
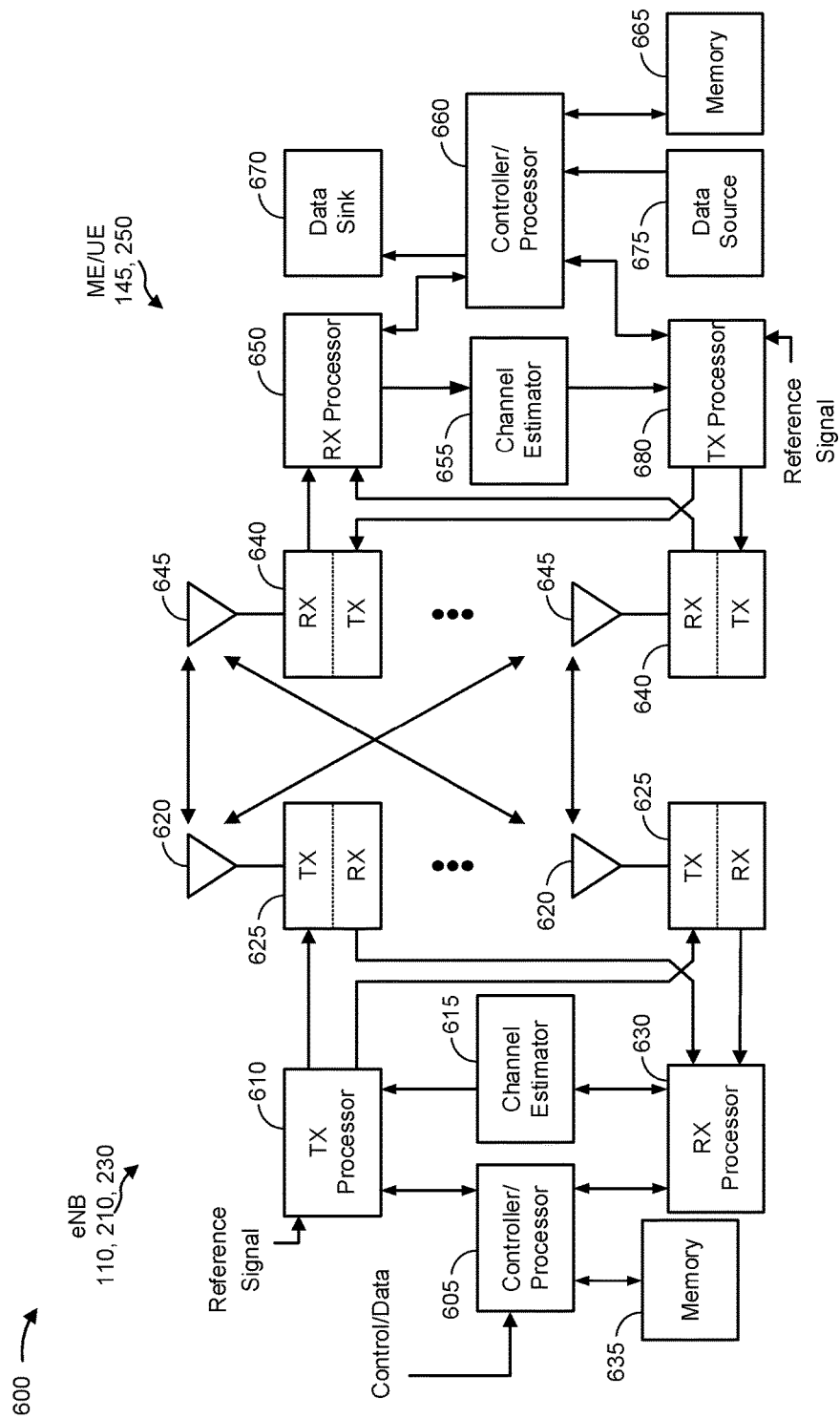
FIG. 6 is a diagram illustrating example components of a base station, such as an evolved Node B, and a user equipment in an access network, in accordance with various aspects of the present disclosure.

FIG. 6 is a diagram illustrating example components 600 of a base station such as an eNB 110, 210, 230 and an equipment, such as a ME/UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, equipment, such as a ME/UE 145, 250, may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the equipment, such as a ME/UE 145, 250, based, at least in part, on various priority metrics. The controller/processor 605 is also responsible for HARQ operations, retransmission of lost packets, and signaling to the equipment, such as a ME/UE 145, 250.

The TX processor 610 implements various signal processing functions for the L1 layer (e.g., physical layer). The signal processing functions includes coding and interleaving to facilitate forward error correction (FEC) at the equipment, such as ME/UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the equipment, such as the ME/UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the equipment, such as the ME/UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the equipment, such as the ME/UE 145, 250. If multiple spatial streams are destined for the ME/UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the equipment, such as the ME/UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the equipment, such as the ME/UE 145, 250. Upper layer packets from the controller/processor 605 may be provided to the core network. The controller/processor 605 is also responsible for error detection using an ACK and/or NACK protocol to support HARQ operations.

In some aspects, one or more components of the equipment, such as the ME/UE 145, 250 may be included in a housing 145', as shown in FIG. 1. One or more components of the equipment, such as ME/UE 145, 250, may be configured to perform power consumption management relating to UICCs, as described in more detail elsewhere herein. For example, the controller/processor 660 and/or other processors and modules of the equipment, such as the ME/UE 145, 250, may perform or direct operations of, for example, process 900 of FIG. 9, process 1000 of FIG. 10, and/or other processes as described herein. In some aspects, one or more of the components shown in FIG. 6 may be employed to perform example process 900, example process 1000, and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Equipment, such as a ME/UE 145, 250, may be associated with a UICC. In some aspects, the UICC may provide simple functionality, such as storage of user, device, and network information, and/or advanced functionality, such as phonebook management, dialing services, and/or the like. The advanced functionality may use more battery power than the simple functionality. Furthermore, some types of advanced functionality may not be useful to certain types of equipment. For example, an Internet of Things (IoT), machine type communication (MTC) ME/UE 145, 250 and/or enhanced MTC (eMTC) ME/UE 145, 250 may have no use for phonebook management or dialing services.

Equipment, such as the ME/UE 145, 250, may poll the UICC to determine whether an identity of the UICC has changed, or to determine whether information stored by the UICC has changed, for example. The polling of the UICC may use battery power of the equipment, such as the ME/UE 145, 250. In some aspects, the equipment, such as an MTC ME/UE, an eMTC ME/UE, a narrowband-(NB)-IoT ME/UE, may comprise at least one battery that may not be rechargeable, may have a smaller form factor, and/or may have a smaller capacity than a battery included in other types of equipment (e.g., MEs/UEs). Consequently, the relative power usage (e.g., for UICC polling) may be low for consumer ME/UEs 145, 250 (e.g., mobile phones, tablets, and/or the like), but the relative power usage (e.g., for UICC polling) may be significant for devices with long battery lives, such as machine type communication (MTC) devices, enhanced MTC (eMTC) devices, and/or the like. In some cases, the UICC may provide for alignment of a polling cycle of the UICC with a discontinuous reception (DRX) cycle of the equipment, such as the ME/UE 145, 250, such as an extended DRX cycle. This may conserve some battery power of equipment such as the ME/UE 145, 250. However, for some ME/UEs 145, 250, such as a ME/UE 145, 250 with a soldered UICC, polling aligned with a DRX cycle or extended DRX cycle may be inefficient and/or wasteful of battery power, since the identity of the UICC and/or the information stored by the UICC is unlikely to change.

Techniques and apparatuses described herein provide power consumption management for a ME/UE 145, 250 associated with a UICC, thereby improving battery life of the ME/UE 145, 250. In aspects, the present methods and apparatus may extend the battery life of equipment, such as an MTC ME/UE, an eMTC ME/UE, an NB-IoT ME/UE, for example that may comprise at least one battery that may not be rechargeable, may have a smaller form factor, and/or may have a smaller capacity than a battery included in other types of equipment (e.g., consumer MEs/UEs like mobile phones, tablets and/or the like). This may be particularly useful for equipment, such as ME/UEs 145, 250, that have a long operational lifespan, such as some eMTC devices. For example, some techniques and apparatuses, described herein, provide for a polling cycle of the UICC to skip every nth eDRX cycle, or to skip m out of every n eDRX cycles, which may be useful when polling of the UICC is unlikely to produce new information. Thus, battery power of the equipment, such as ME/UE 145, 250, is conserved. Additionally, or alternatively, some techniques and apparatuses may provide configuration of UICC features or functionality based at least in part on a device category of the equipment, such as ME/UE 145, 250. For example, the UICC may provide configuration information to the ME/UE 145, 250 relating to an operation associated with power consumption based at least in part on a device category of the equipment, such as ME/UE 145, 250. The configuration information may indicate a configuration of the equipment, such as ME/UE 145, 250 based at least in part on the device category. For example, the equipment, such as ME/UE 145, 250, may activate or deactivate certain features of the UICC, may perform polling in a particular fashion, and/or the like. Thus, battery consumption may be selectively decreased based at least in part on a device category of the equipment, such as the ME/UE 145, 250.

Figure 7:
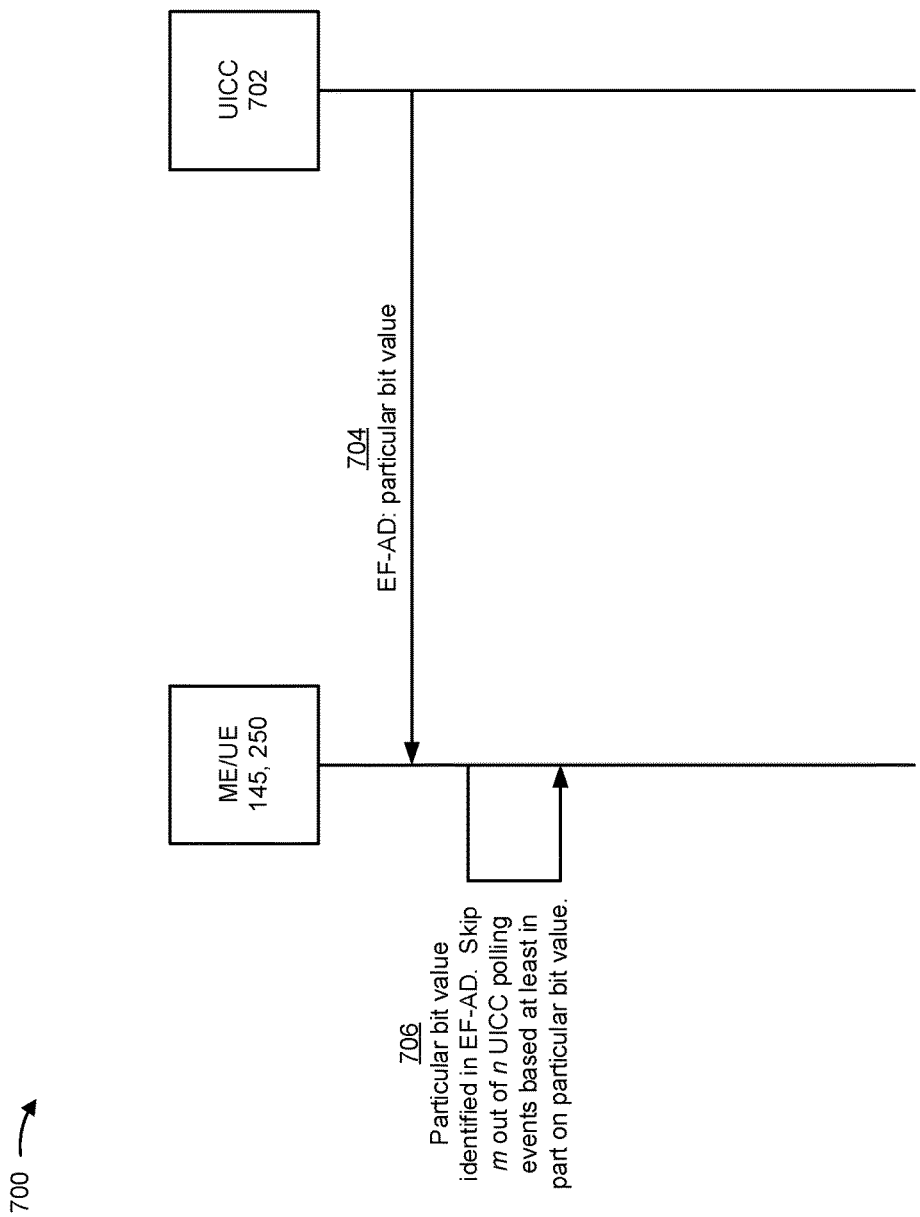
FIG. 7 is a diagram illustrating an example of configuring a paging cycle of a universal integrated circuit card for power management, in accordance with various aspects of the present disclosure.

FIG. 7 is a diagram illustrating an example 700 of configuring a paging cycle of a universal integrated circuit card for power management, in accordance with various aspects of the present disclosure. In FIG. 7, an equipment, such as a ME/UE 145, 250, communicates with a UICC 702. The UICC 702 may include a UICC, a SIM, a USIM, and/or a SIM card of the equipment, such as the ME/UE 145, 250.

As shown in FIG. 7, and by reference number 704, the UICC 702 may include and/or provide information associated with elementary file (EF) such as, an EF-administrative data (AD) to the equipment, such as the ME/UE 145, 250. As further shown, the EF-AD may include at least one field having a particular bit value. The particular bit value may indicate, to the equipment, such as the ME/UE 145, 250, to skip at least one polling event associated with the UICC 702.

In some aspects, the particular bit value may be associated with a different EF than the EF-AD. For example, the particular bit value may be included in any EF that can be provided by a USIM application. Additionally, or alternatively, the particular bit value may include multiple different bits. For example, the multiple different bits may identify at least one polling event, out of a plurality of polling events, to skip.

In some aspects, the UICC 702 may provide the EF-AD based at least in part on a configuration of the UICC 702. For example, the UICC 702 may provide the EF-AD based at least in part on the UICC 702 being soldered to the equipment, such as the ME/UE 145, 250, or otherwise un-detachable from the equipment, such as the ME/UE 145, 250. In such a case, the UICC 702 may provide the EF-AD to decrease a frequency of a polling cycle of the equipment, such as the ME/UE 145, 250, which conserves battery power that would otherwise be used to perform polling at a more frequent interval. In some aspects, the UICC 702 may not be soldered to the equipment, such as the ME/UE 145, 250, and may provide the EF-AD (e.g., to conserve battery power of the equipment, such as the ME/UE 145, 250).

As shown by reference number 706, the equipment, such as the ME/UE 145, 250, may identify the particular bit value in the EF-AD. As further shown, the equipment, such as the ME/UE 145, 250, may skip at least one polling event based at least in part on detecting the particular bit value. Here, the equipment, such as the ME/UE 145, 250, determines to skip every m out of n polling events. Assume that m and n are integers. Assume that n is greater than or equal to m. In some aspects, the equipment, such as the ME/UE 145, 250, may determine to skip every nth polling events, and/or the like. In some aspects, the polling events may be aligned with a DRX cycle of the equipment, such as the ME/UE 145, 250, such as an eDRX cycle. In such a case, the equipment, such as the ME/UE 145, 250, may determine to skip at least one polling event for a particular number of eDRX cycle on durations.

In some aspects, the equipment, such as the ME/UE 145, 250, may identify a polling event to skip based at least in part on information stored by the equipment, such as the ME/UE 145, 250. For example, the equipment, such as the ME/UE 145, 250, may store information indicating to skip a particular polling event when the particular bit value is identified or received. In some aspects, the particular bit value may indicate which polling event to skip. For example, the particular bit value may identify a value of m and/or n when the equipment, such as the ME/UE 145, 250, is to skip every nth polling event or m of every n polling events. Assume that m and n are integers. In aspects, assume that n is greater than or equal to m.

As indicated above, FIG. 7 is provided as an example. Other examples are possible and may differ from what was described with respect to FIG. 7.

Figure 8A:
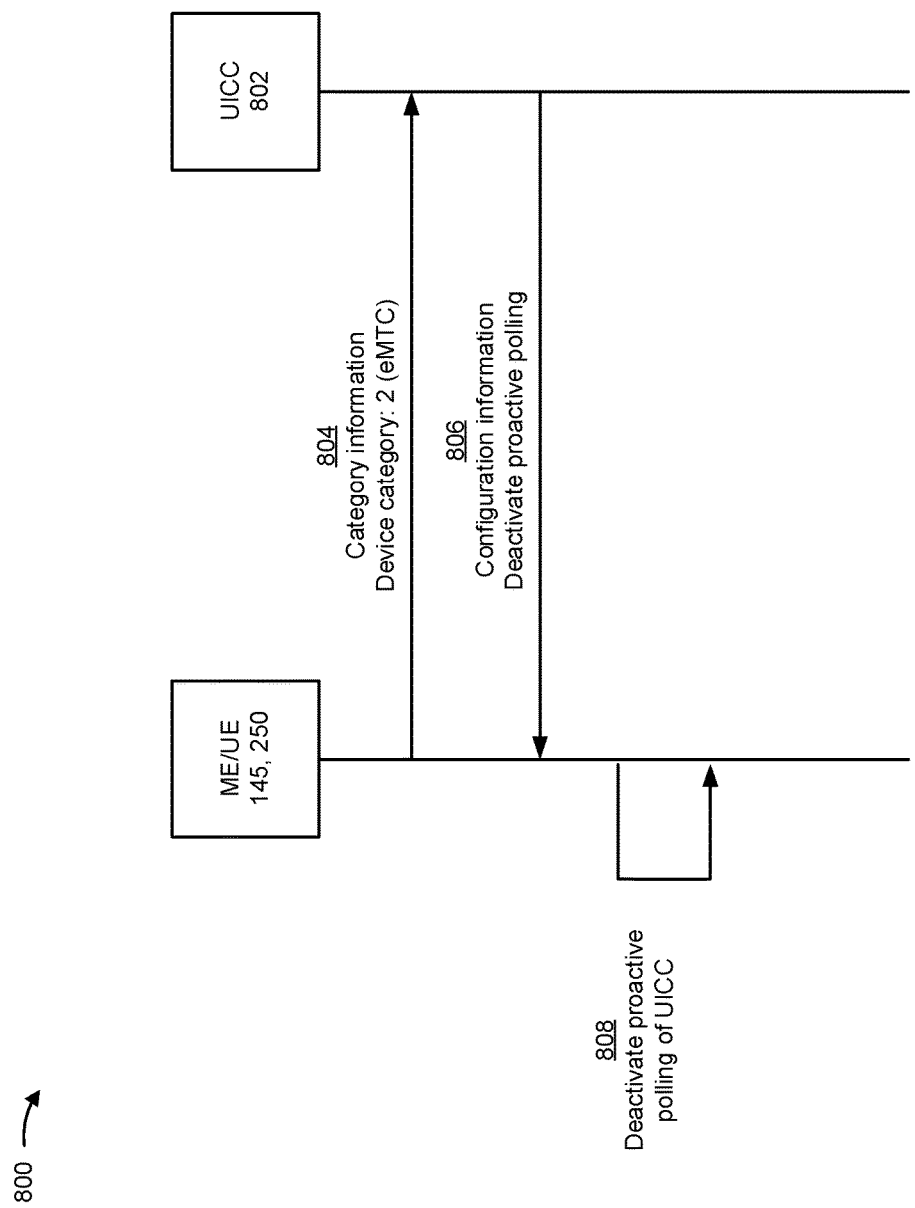

FIGS. 8A and 8B are diagrams illustrating examples 800 of configuring features associated with a universal integrated circuit card for power management, in accordance with various aspects of the present disclosure. In FIGS. 8A and 8B, an equipment, such as a ME/UE 145, 250, communicates with a UICC 802. The UICC 802 may include a UICC, a SIM, a USIM, and/or a SIM card of equipment, such as ME/UE 145, 250.

As shown in FIG. 8A, and by reference number 804, equipment, such as the ME/UE 145, 250, may provide category information to the UICC 802. The category information may identify a device category of equipment, such as the ME/UE 145, 250. For example, the device category may include a first category (e.g., category 1) corresponding to consumer devices (e.g., a mobile phone, a tablet, and/or the like), a second category (e.g., category 2) corresponding to eMTC devices, and/or the like. In some aspects, the category information may be provided as part of a particular message or field. For example, the category information may be provided using a terminal capability field and/or the like.

A device category may be associated with corresponding configuration information. The configuration information may be stored by the UICC 802. The configuration information may identify a configuration of the equipment, such as the ME/UE 145, 250, and/or the UICC 802 relating to power consumption by the ME/UE 145, 250. As one example, for the second category of device (described in connection with FIG. 8A), the configuration information may indicate to align a UICC polling interval with an eDRX cycle of the equipment, such as the ME/UE 145, 250, may indicate to deactivate proactive polling, may indicate to deactivate an advanced feature of the UICC 802 (e.g., phonebook management, a dialing service, and/or the like), and/or the like. As another example, the configuration information for the second category of device (described in connection with FIG. 8B) may indicate to perform proactive polling, to activate an advanced feature, and/or the like.

As shown by reference number 806, the UICC 802 may provide the configuration information to the equipment, such as the ME/UE 145, 250. As further shown, the configuration information may indicate to deactivate proactive polling. For example, proactive polling may use battery power of the equipment, such as the ME/UE 145, 250, and may not be beneficial for a particular device category of the equipment, such as ME/UE 145, 250, for example like an eMTC ME/UE 145, 250. By deactivating proactive polling, battery power of the ME/UE 145, 250 is conserved. In some aspects, the configuration information may indicate to align a UICC polling cycle with an eDRX cycle of the equipment, such as the ME/UE 145, 250, may indicate to deactivate an advanced feature, and/or the like. As shown by reference number 808, the equipment, such as the ME/UE 145, 250, deactivates proactive polling of the equipment, such as the ME/UE 145, 250, based at least in part on the configuration information. In this way, battery power of the equipment, such as ME/UE 145, 250, is conserved.

As shown in FIG. 8B, and by reference number 810, in some aspects, the equipment, such as the ME/UE 145, 250, may provide category information indicating that the equipment is a consumer device (e.g. a mobile phone, a tablet, and/or the like). As shown by reference number 812, the UICC 802 may provide configuration information for equipment, such as the ME/UE 145, 250, based at least in part on the device category of equipment, such as the ME/UE 145, 250. As further shown, the configuration information indicates to activate an advanced feature (e.g., phonebook management), and to perform proactive polling. As shown by reference number 814, the equipment, such as the ME/UE 145, 250, activates phonebook management based at least in part on the configuration information. As shown by reference number 816, the equipment, such as the ME/UE 145, 250, performs proactive polling based at least in part on the configuration information. In this way, advanced features and/or proactive polling are enabled for a particular device category of the equipment, such as ME/UE 145, 250 like a consumer-type ME/UE 145, 250 (e.g. a mobile phone, a tablet, and/or the like), which may improve performance and user experience associated with the ME/UE 145, 250.

As indicated above, FIGS. 8A and 8B are provided as examples. Other examples are possible and may differ from what was described with respect to FIGS. 8A and 8B.

Figure 9:
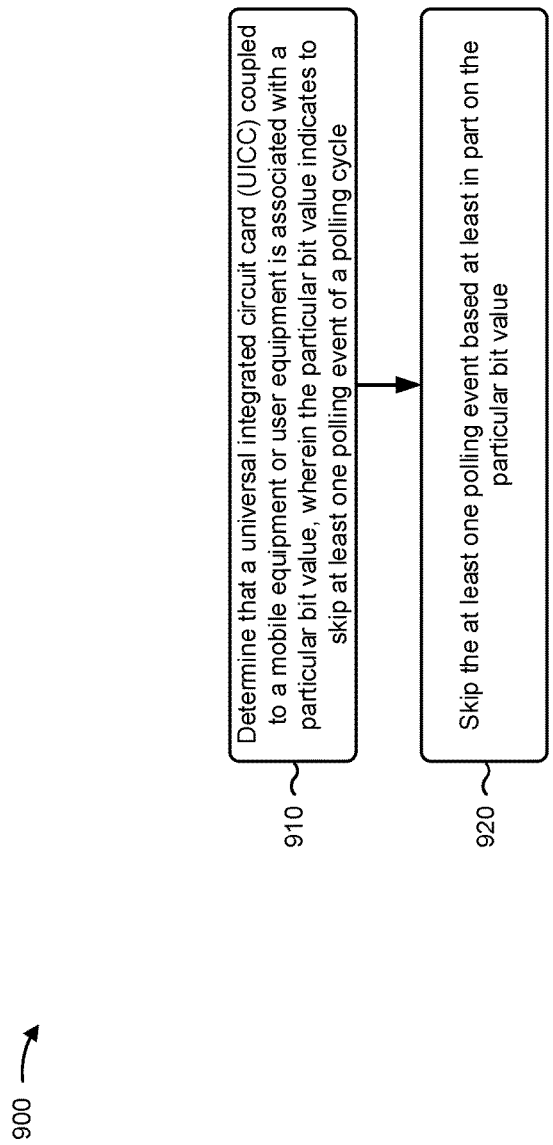
FIG. 9 is a diagram illustrating an example process performed, for example, by an equipment, such as a ME/UE, in accordance with various aspects of the present disclosure.

FIG. 9 is a diagram illustrating an example process 900 performed, for example, by a wireless communication device, in accordance with various aspects of the present disclosure. Example process 900 is an example where an equipment or a wireless communication device (e.g., ME/UE 145, 250) configures a polling cycle of a universal integrated circuit card for power management.

As shown in FIG. 9, in some aspects, process 900 may include determining that a universal integrated circuit card (UICC) coupled to an equipment, such as ME/UE, is associated with a particular bit value, wherein the particular bit value indicates to skip at least one polling event of a polling cycle (block 910). For example, the wireless communication device may determine that a UICC coupled to the wireless communication device is associated with a particular bit value. In some aspects, the particular bit value may be in an EF of the UICC. The particular bit value may indicate to skip at least one polling event of a polling cycle. For example, the polling cycle may be a UICC polling cycle, and the particular bit value may indicate to skip the at least one polling event to conserve battery power of the wireless communication device.

As shown in FIG. 9, in some aspects, process 900 may include skipping the at least one polling event based at least in part on the particular bit value (block 920). For example, the wireless communication device may skip the at least one polling event. In some aspects, the wireless communication device may skip multiple polling events. For example, the wireless communication device may skip polling events at a regular interval, may skip a particular number of polling events, may skip polling events for a particular number of eDRX cycle lengths, and/or the like.

In some aspects, the polling cycle is aligned with an extended discontinuous reception (eDRX) cycle of the equipment, such as the ME/UE. In some aspects, the at least one polling event corresponds to every nth eDRX wakeup event, where n is an integer. In some aspects, the at least one polling event corresponds to every m out of n eDRX wakeup events, where m and n are integers. In some aspects, the particular bit value is for an extended field associated with the UICC. In some aspects, the UICC is a soldered card.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
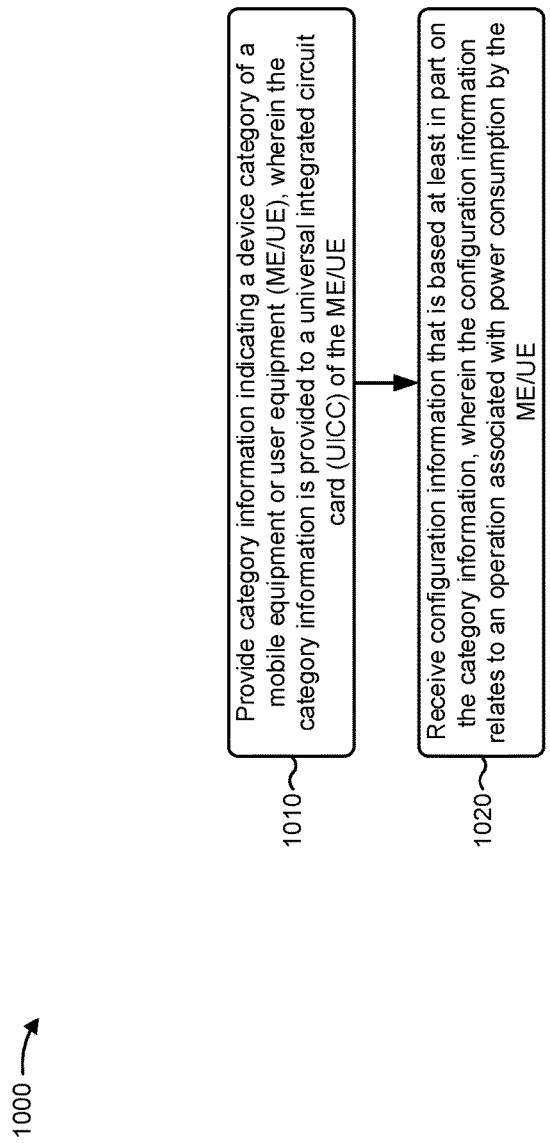
FIG. 10 is a diagram illustrating an example process performed, for example, by an equipment, such as a ME/UE, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device (e.g., ME/UE 145, 250) configures features associated with a universal integrated circuit card for power management.

As shown in FIG. 10, in some aspects, process 1000 may include providing category information indicating a device category of an equipment, such as a mobile equipment or user equipment (ME/UE), wherein the category information is provided to a universal integrated circuit card (UICC) of the equipment, such as the ME/UE (block 1010). For example, the wireless communication device may provide category information to a UICC of the wireless communication device. The category information may identify a device category of the wireless communication device. For example, the device category may be based at least in part on the LTE ue_Categories defined by the Third Generation Partnership Project (3GPP). Additionally, or alternatively, the device category may include a first category for eMTC devices (e.g., Category 1, Category M1, Category M2), and a second category for consumer devices (e.g., Category 2, and/or the like).

As shown in FIG. 10, in some aspects, process 1000 may include receiving configuration information that is based at least in part on the category information, wherein the configuration information relates to an operation associated with power consumption by the equipment, such as the ME/UE (block 1020). For example, the UICC may provide configuration information to the wireless communication device. The configuration information may be based at least in part on the category information. For example, the configuration information may relate to an operation associated with power consumption by the wireless communication device, and may be configured to reduce power consumption for wireless communication devices of a particular device category.

In some aspects, for example, the category information indicates that the ME/UE is a Category 1 ME/UE, and wherein the ME/UE is configured to perform the operation based at least in part on the ME/UE being a Category 1 ME/UE. In some aspects, the operation relates to configuring a polling cycle of the UICC to align with a discontinuous reception cycle of the ME/UE. In some aspects, the operation relates to deactivation of proactive polling of the UICC. In some aspects, the operation relates to deactivation of a phonebook management or dialing service of the UICC. In some aspects, the category information indicates that the ME/UE is a Category 2 ME/UE, and the operation includes activation of proactive polling of the UICC. In some aspects, the device category is based at least in part on a ue_Category definition provided by the Third Generation Partnership Project (3GPP). In some aspects, the category information is provided using a terminal capability field.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of wireless communication, comprising:
   determining, by a mobile equipment or user equipment (ME/UE), that a universal integrated circuit card (UICC) coupled to the ME/UE is associated with a particular bit value included in an elementary file, wherein the particular bit value indicates which at least one polling event of a polling cycle to skip by identifying at least one of:
       a value n when the ME/UE is to skip a polling event for every nth polling cycle, or
       a value m and a value p when the ME/UE is to skip a polling event for m of every p polling cycles; and
   skipping, by the ME/UE, the at least one polling event based at least in part on the particular bit value.

2. The method of claim 1, wherein the polling cycle is aligned with an extended discontinuous reception (eDRX) cycle of the ME/UE.

3. The method of claim 2, wherein the at least one polling event corresponds to an eDRX wakeup event for every nth eDRX cycle, where n is an integer.

4. The method of claim 2, wherein the at least one polling event corresponds to an eDRX wakeup event for every m out of p eDRX cycles, where m and p are integers.

5. The method of claim 1, wherein the particular bit value is for an extended field associated with the UICC.

6. The method of claim 1, wherein the UICC is a soldered card.

7. A mobile equipment or user equipment (ME/UE), comprising:
   a memory; and
   one or more processors, operatively coupled to the memory, the one or more processors configured to:
       determine that a universal integrated circuit card (UICC) coupled to the ME/UE is associated with a particular bit value included in an elementary file, wherein the particular bit value indicates which at least one polling event of a polling cycle to skip by identifying at least one of:
           a value n when the ME/UE is to skip a polling event for every nth polling cycle, or
           a value m and a value p when the ME/UE is to skip a polling event for m of every p polling cycles; and
       skip the at least one polling event based at least in part on the particular bit value.

8. The ME/UE of claim 7, wherein the polling cycle is aligned with an extended discontinuous reception (eDRX) cycle of the ME/UE.

9. The ME/UE of claim 8, wherein the at least one polling event corresponds to an eDRX wakeup event for every nth eDRX wakeup cycle, where n is an integer.

10. The ME/UE of claim 8, wherein the at least one polling event corresponds to an eDRX wakeup event for every m out of p eDRX wakeup cycles, where m and p are integers.

11. The ME/UE of claim 7, wherein the particular bit value is for an extended field associated with the UICC.

12. The ME/UE of claim 7, wherein the UICC is a soldered card.

13. An apparatus for wireless communication, comprising:
   means for determining that a universal integrated circuit card (UICC) coupled to the apparatus is associated with a particular bit value included in an elementary file, wherein the particular bit value indicates which at least one polling event of a polling cycle to skip by identifying at least one of:
       a value n when the apparatus is to skip a polling event for every nth polling cycle, or
       a value m and a value p when the apparatus is to skip a polling event for m of every p polling cycles; and
   means for skipping the at least one polling event based at least in part on the particular bit value.

14. The apparatus of claim 13, wherein the polling cycle is aligned with an extended discontinuous reception (eDRX) cycle of the apparatus.

15. The apparatus of claim 14, wherein the at least one polling event corresponds to an eDRX wakeup event for every nth eDRX cycle, where n is an integer.

16. The apparatus of claim 14, wherein the at least one polling event corresponds to an eDRX wakeup event for every m out of p eDRX wakeup cycles, where m and p are integers.

17. The apparatus of claim 13, wherein the particular bit value is for an extended field associated with the UICC.

18. The apparatus of claim 13, wherein the UICC is a soldered card.

19. The apparatus of claim 13, where the elementary file is provided by the UICC based on the UICC being un-detachable from the apparatus.

20. A non-transitory computer-readable medium storing one or more instructions for wireless communication, the instructions comprising:
the one or more instructions, when executed by one or more processors of an equipment may cause the one or more processors to:
determine that a universal integrated circuit card (UICC) coupled to the equipment is associated with a particular bit value included in an elementary file, wherein the particular bit value indicates which at least one polling event of a polling cycle to skip by identifying at least one of:
a value n when the equipment is to skip a polling event for every nth polling cycle, or
a value m and a value p when the equipment is to skip a polling event for m of every p polling cycles; and
skip the at least one polling event based at least in part on the particular bit value.

21. The non-transitory computer-readable medium of claim 20, wherein the polling cycle is aligned with an extended discontinuous reception (eDRX) cycle of the equipment.

22. The non-transitory computer-readable medium of claim 21, wherein the at least one polling event corresponds to an eDRX wakeup event for every nth eDRX wakeup cycle, where n is an integer.

23. The non-transitory computer-readable medium of claim 21, wherein the at least one polling event corresponds to an eDRX wakeup event for every m out of p eDRX wakeup cycles, where m and p are integers.

24. The non-transitory computer-readable medium of claim 20, wherein the particular bit value is for an extended field associated with the UICC.

25. The non-transitory computer-readable medium of claim 20, wherein the UICC is a soldered card.

26. The non-transitory computer-readable medium of claim 20, where the elementary file is provided by the UICC based on the UICC being un-detachable from the equipment.

27. The method of claim 1, where the elementary file is provided by the UICC based on the UICC being un-detachable from the ME/UE.

28. The ME/UE of claim 7, where the elementary file is provided by the UICC based on the UICC being un-detachable from the ME/UE.

* * * * *